United States Patent
Ho et al.

(10) Patent No.: US 10,091,859 B2
(45) Date of Patent: Oct. 2, 2018

(54) POWER SUPPLY WITH MICROCONTROLLER FOR CIRCUIT PROTECTION

(71) Applicant: CREE, INC., Durham, NC (US)

(72) Inventors: Yee Ping Ho, Hong Kong (CN); Low Ho Kan, Hong Kong (CN); Yeung Kai Wing, Hong Kong (CN)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/192,277

(22) Filed: Jun. 24, 2016

(65) Prior Publication Data

US 2017/0374720 A1    Dec. 28, 2017

(51) Int. Cl.
| | |
|---|---|
| *H02M 1/32* | (2007.01) |
| *H02H 7/12* | (2006.01) |
| *H05B 33/08* | (2006.01) |
| *H02H 3/20* | (2006.01) |
| *H02M 3/156* | (2006.01) |

(52) U.S. Cl.
CPC .......... *H05B 33/0887* (2013.01); *H02H 3/20* (2013.01); *H02H 7/12* (2013.01); *H02M 1/32* (2013.01); *H02M 3/156* (2013.01); *H05B 33/0815* (2013.01); *H05B 33/0845* (2013.01)

(58) Field of Classification Search
CPC .......... H05B 33/0815; H05B 33/0845; H05B 33/0887; H02H 3/20; H02H 3/04; H02H 7/12; H02M 1/08
See application file for complete search history.

(56) References Cited

U.S. PATENT DOCUMENTS

| | | | |
|---|---|---|---|
| 8,425,071 B2 | 4/2013 | Ruud et al. | |
| 8,591,062 B2 | 11/2013 | Hussell et al. | |
| 8,596,819 B2 | 12/2013 | Negley et al. | |
| 8,622,584 B2 | 1/2014 | Kinnune et al. | |
| 8,975,826 B1 * | 3/2015 | Stevens | H05B 33/0815 |
| | | | 315/185 S |
| 9,028,087 B2 | 5/2015 | Wilcox et al. | |
| 9,182,096 B2 | 11/2015 | Kinnune et al. | |

(Continued)

FOREIGN PATENT DOCUMENTS

KR     20120075958 A   *  7/2012

OTHER PUBLICATIONS

Machine Translation of Korean Patent Doucment 2012-0075958.*
Atmel Corporation; Smart ARM-based Microcontroller SAM D21E/SAM D21G/SAM D21J Datasheet Summary, 2016, 58 Pages.

*Primary Examiner* — Dedei K Hammond
*Assistant Examiner* — Raymond R Chai
(74) *Attorney, Agent, or Firm* — Charles L. Moore; Moore & Van Allen PLLC

(57) ABSTRACT

A power supply using a microcontroller for circuit protection and an LED lighting system using the power supply are disclosed. A power supply according to embodiments of the present invention includes a floating converter and at least a first reference voltage source connected to a negative output terminal of the floating converter. A microcontroller is connected to the first reference voltage source and to a control input of the floating converter, which may be a floating buck converter. In some embodiments, a second reference voltage source is connected to the microcontroller. A voltage divider and/or a comparator can be used to provide one or both voltage reference sources.

20 Claims, 8 Drawing Sheets

(56) References Cited

U.S. PATENT DOCUMENTS

| | | |
|---|---|---|
| 2012/0051041 A1 | 3/2012 | Edmond et al. |
| 2012/0187847 A1* | 7/2012 | Hamamoto ........ H05B 33/0815 |
| | | 315/125 |
| 2012/0327650 A1 | 12/2012 | Lay et al. |
| 2014/0097755 A1* | 4/2014 | Lee ...................... H05B 33/083 |
| | | 315/122 |
| 2014/0347885 A1 | 11/2014 | Wilcox et al. |
| 2014/0355302 A1 | 12/2014 | Wilcox et al. |
| 2015/0253488 A1 | 9/2015 | Wilcox et al. |
| 2015/0362168 A1 | 12/2015 | Power et al. |
| 2017/0070142 A1* | 3/2017 | Sundararaj ............. H02H 3/202 |

* cited by examiner

POWER SUPPLY WITH MICROCONTROLLER FOR CIRCUIT PROTECTION

BACKGROUND

To ensure product safety, a power supply for a consumer electronic product needs to have output over-voltage protection (OVP) and short-circuit protection (SCP) to shut down the power supply circuitry in the event of abnormal operation. A traditional OVP circuit used with a floating converter circuit such as a floating buck converter uses differential detection. FIG. 1 illustrates such a circuit. Power supply 100 includes a differential detection circuit 102 across the positive and negative output terminals of floating buck converter 104 to sense output voltage. Once the differential output voltage is larger than the designed voltage, differential detection circuit 102 triggers control circuit 106 to shut down the converter. In this example, the differential detection circuit and/or the control circuit are specifically designed for the output voltage required of the floating buck converter.

A traditional SCP circuit used with the floating buck converter is more complicated. As shown in FIG. 2, circuit 200 includes differential amplifier 202 connected across a resistor RL in series with the load driven by floating buck converter 204. Amplifier 202 converts the sensing signal to a voltage signal which references control ground through resister RS. Once the load current rises above a designated level, the differential amplifier triggers control circuit 206. For a high voltage power supply output, the negative side voltage with reference to control ground is very high and an expensive differential amplifier with a high-voltage transistor must be used.

SUMMARY

Embodiments of the present invention include a protection mechanism for a power supply based on a floating converter circuit, such as a floating buck converter. A floating buck converter can have advantages as compared to a non-floating converter circuit, including fast driving speed, low switching loss, and high efficiency. However, the relatively high, variable output voltage makes over-voltage and short-circuit protection complex. Embodiments of the present invention overcome difficulties in protecting a floating converter from over-voltage and short circuit conditions by indirectly determining the output voltage of the power supply.

A power supply according to embodiments of the present invention includes a floating converter and at least one reference voltage source connected to a negative output terminal of the floating converter. A microcontroller is connected to the reference voltage source and to a control input of the floating converter. In some embodiments, the reference voltage source includes a voltage divider connected to the microcontroller. In some embodiments, the reference voltage source includes a comparator either within or connected to the microcontroller.

In some embodiments, a first reference voltage source is used for over-voltage protection and a second reference voltage source is used for short-circuit protection. In some embodiments an LED lighting system such as a lamp or light fixture includes the power supply driving at least one LED. In some embodiments, a voltage reference source includes a comparator and an RC circuit connected between the comparator and the microcontroller. The RC circuit may be connected to a pulse-width modulation output of the microcontroller to ultimately generate the reference voltage.

A power supply and/or an LED lighting system according to some example embodiments of the invention includes a floating converter. The floating converter is monitored by a microcontroller. The microcontroller compares a negative output voltage of the floating buck converter to a first reference voltage, and compares the negative output voltage of the floating buck converter to a second reference voltage. The microcontroller shuts down the power supply when the negative output voltage of the floating buck converter is less than the first reference voltage and/or when the negative output voltage of the floating buck converter is greater than the second reference voltage.

DETAILED DESCRIPTION

Figure 1:
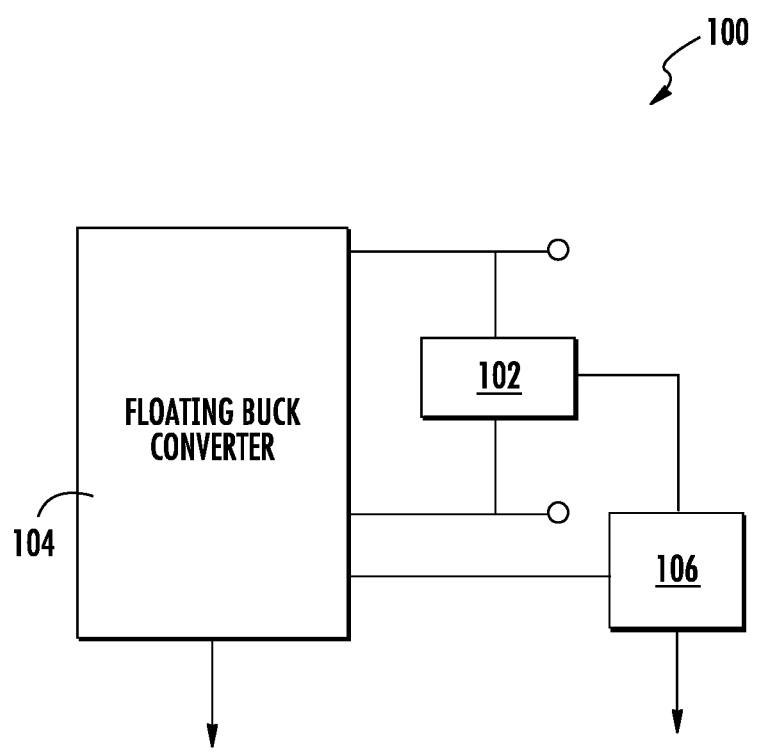
FIG. 1 is a block diagram illustrating an over-voltage protection technique for a power supply based on a floating buck converter.
Figure 2:
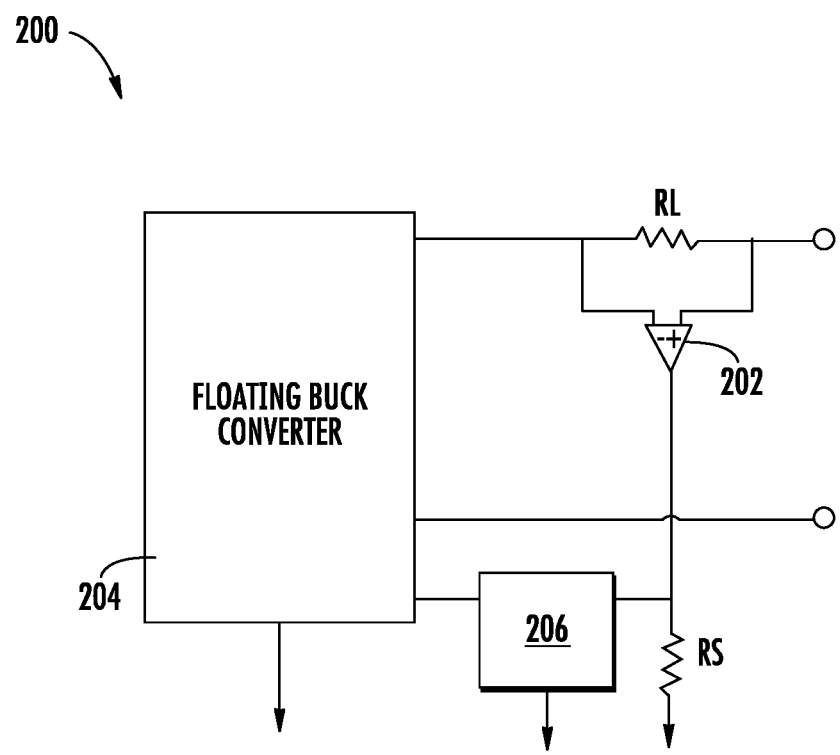
FIG. 2 is a schematic diagram illustrating a short-circuit protection technique for a power supply based on a floating buck converter.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid-state light emitter" or "solid-state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid-state light emitters and/or multiple lumiphoric materials (i.e., in combination with at least one solid-state light emitter) may be used in a single device, such as to produce light perceived as white or near-white in character. In certain embodiments, the aggregated output of multiple solid-state light emitters and/or lumiphoric materials may generate warm white light output having a color temperature range of from about 2700 K to about 4000 K.

Solid-state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid-state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials may be associated with a lumiphor, a lumiphor binding medium, or a lumiphor support element that may be spatially segregated from a solid-state emitter.

It should also be noted that the term "lamp" is meant to encompass not only a solid-state replacement for a traditional incandescent bulb as illustrated herein, but also replacements for fluorescent bulbs, replacements for complete fixtures, and any type of light fixture that may be custom designed as a solid state fixture.

The term "LED lighting system" or the term "solid-state lighting system" as used herein can refer to a fixture, an assembly, a light engine, or any other solid-state lighting arrangement. The term "LED lighting assembly" is meant to refer to a portion of a fixture that includes a light engine or light basket. For example, this term could be used to refer to an assembly that is provided to engage with a portion of a pre-existing fixture to allow retrofitting of solid-state lighting with minimal effort. Terms such as "fixture" or "light fixture" are intended to have their conventional meaning as is known within the architectural lighting arts. The term "mounting arrangement" in the context of the present disclosure is intended to refer to hardware and/or components that enable a lighting assembly to be used in a retrofit application. For example, the mounting arrangement could include a mounting plate with appropriate tabs, holes, or the like to engage with a portion of a pre-existing light fixture.

Figure 3:
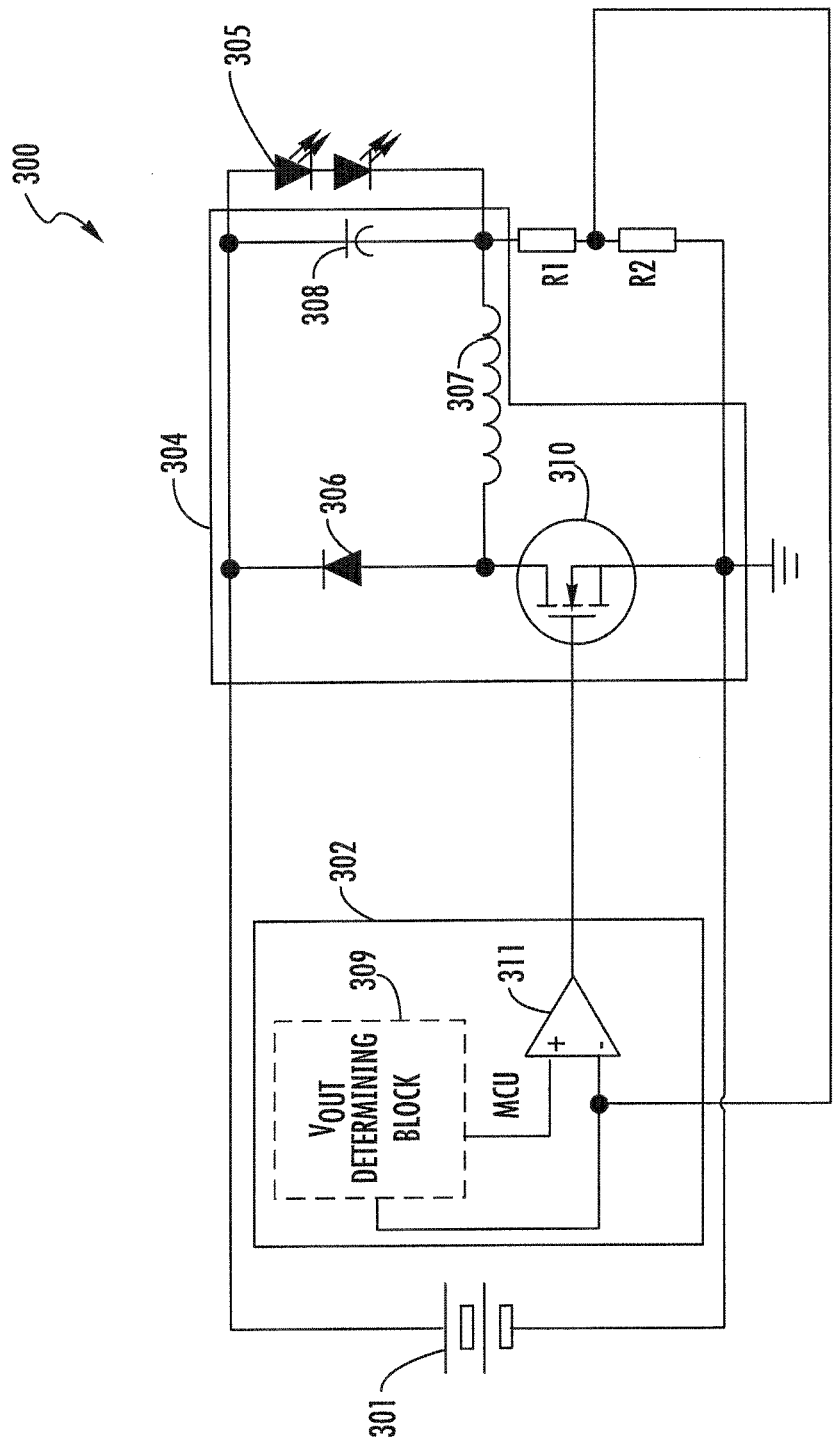
FIG. 3 is a schematic diagram of a power supply and LED lighting system according to embodiments of the present invention.

FIG. 3 is a schematic diagram of a lighting system or lamp according to example embodiments of the invention. In lighting system 300 of FIG. 3, the power supply portion of the lamp received power from power source 301. The power supply portion is shown in detail. In the power supply of FIG. 3, microcontroller 302 replaces otherwise more bulky and expensive components. The microcontroller may also be referred to herein as the "microcontroller unit" or "MCU." For over-voltage protection (OVP), a voltage divider made up of resistors R1 and R2 is connected to the negative output voltage terminal of floating buck converter 304, which is driving an LED or a plurality of LED devices 305 through diode 306, inductor 307 and capacitor 308. The voltage divider serves as a first reference voltage source for OVP that allows the microcontroller 302 connected to the voltage divider to estimate the output voltage of the floating converter 304 to perform OVP decisioning. Since the voltage of the power factor controller (PFC, not shown) in the floating buck converter 304 is known, and the sum of the electrical potential differences around any closed network is zero, the output voltage of the converter can be estimated from the negative side voltage determined by the detection network. This embodiment of the invention has been tested in a design with a PFC voltage of 470 V DC. With this configuration, the output voltage can be expressed as:

$$Vout = 470 - (MCU\ Detected\ Voltage) \div \frac{R2}{R1+R2}$$

The above analysis assume a microcontroller that includes a built-in comparator and digital to analog converter (DAC). An example of such a microcontroller is the Atmel® SAM D 21 ARM microcontroller. The DAC generates a reference voltage, which is related to the output voltage of the floating converter to compare with the negative output voltage. With an open load, the output negative side voltage drops dramatically. When the voltage has dropped lower than the reference voltage, the hardware comparator generates a signal to shut down the converter. With the above-referenced parameters, the reference voltage at full load (380 V DC output) is 0.6 V. A voltage determining block 309 within MCU 302 automatically adjusts the reference voltage to 2.65 V when it finds the output voltage at steady state is 220 V. Once the output negative side voltage drops below that level, the MCU will generate a pulse to drive signal MOSFET 310 to shut down the floating buck converter 304. For an LED lighting system application, the status of the dimming command must also be monitored to adjust the reference voltage to compensate for the change in the LED forward voltage, which means the reference voltage increases if the driver is dimmed or decreases if the driver is loaded with higher current.

Still referring to FIG. 3, for short-circuit protection (SCP), the microcontroller also checks the status of the negative side output voltage from the floating buck converter to determine whether a failure has occurred. In this case, the ramping of output current is controlled by the MCU 302 through the change in a regulated current reference as detected through its comparator 311, which has an input connected to a reference output from the voltage determining block. Any time the MCU determines the negative side voltage is higher than the designed value, it shuts down the driver immediately to achieve SCP. Two different short circuit scenarios need to be accounted for.

Firstly, to detect a short circuit as the power supply starts up, the MCU commands the converter to increase output current. At the same time, the MCU closely monitors the negative side voltage. If the MCU finds that the voltage does not drop but rather stays at a highest value (3.3 V given the design parameters discussed above) while it commands the converter to increase the load current, the output is assumed to be shorted and the power supply and lighting system are shut down.

Secondly, to detect a short circuit in normal operation, the negative side voltage is monitored to determine if it rises above an SCP trigger level. Thus, the negative side voltage is always kept between the OVP trigger level and SCP trigger level. If the negative side voltage rises higher than the SCP trigger level suddenly while the MCU is not directing the converter to decrease output current for a dimming level change, the output is assumed to be shorted and the power supply is shut down.

In both the short-circuit cases discussed above, the MCU uses the status of negative side voltage through comparison with an SCP trigger level to determine if a failure has occurred and shut down the power supply immediately. As the designed voltage value is an adjustable variable, it can be changed for different output voltage condition to obtain fast response for short-circuit protection. It should also be noted that embodiments of the invention can be implemented with various converter/driver architectures. While a buck converter is illustrated herein, as an example, a buck-boost converter could be used, with appropriate modifications to the SCP/OVP circuitry to account for the fact that such a converter has an AC output.

Figure 4:
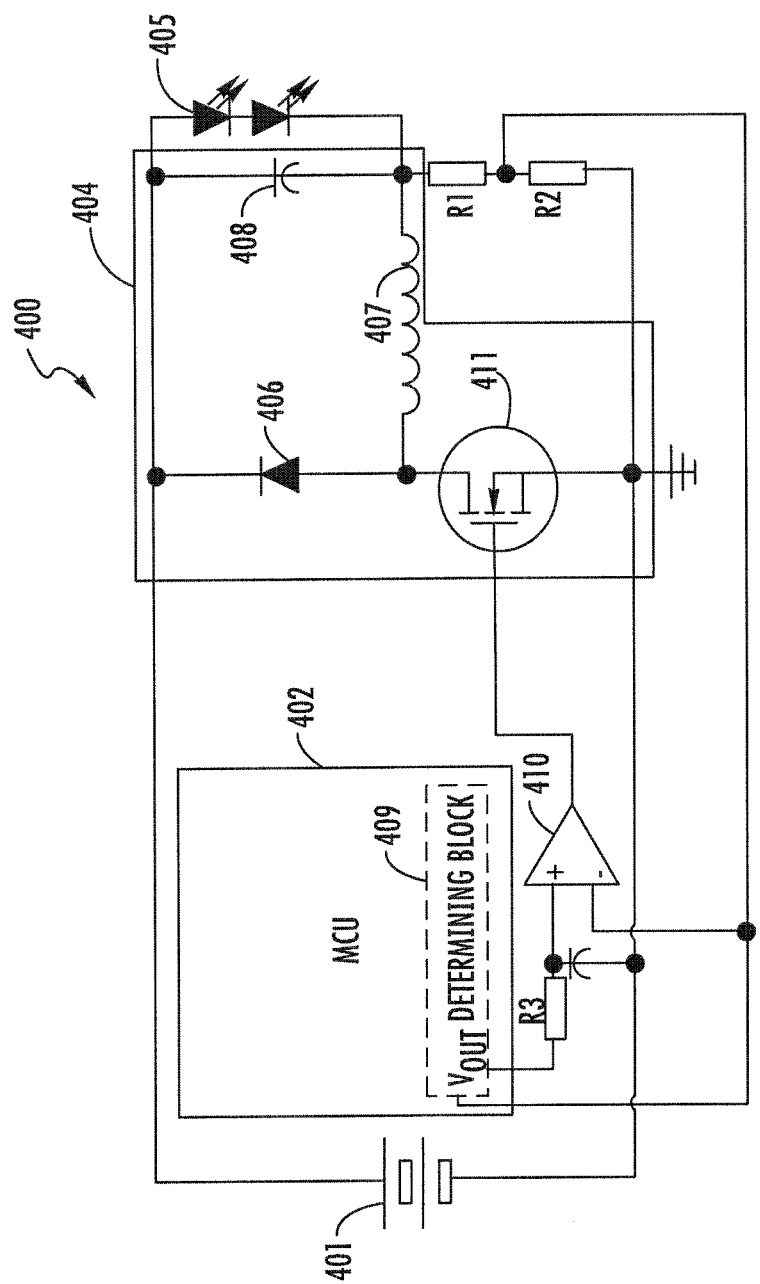
FIG. 4 is a schematic diagram of a power supply and LED lighting system according to additional embodiments of the present invention.

FIG. 4 is a schematic diagram of a lighting system or lamp according to additional embodiments of the invention. The system includes MCU 402 and a floating buck converter 404 driving an LED or a plurality of LED devices 405 through diode 406, inductor 407, and capacitor 408. In the example of FIG. 4, microcontroller 402 does not include an on-board comparator or DAC. In this case, for over-voltage protection (OVP), an adaptive first reference voltage is generated by using a pulse-width modulation (PWM) output from voltage determining block 409 of the MCU, an RC filter including capacitor C and resistor R3, and an external comparator 410 to generate a pulse to drive MOSFET 411. This design still has most if not all of the advantages already discussed.

With respect to the microcontroller discussed above, any general-purpose processor such as a digital signal processor, microcontroller, microcontroller unit (MCU) or microprocessor can be used and non-transitory firmware, software, or microcode can be stored in a tangible storage medium that is associated with the device. Such a medium may be a memory integrated into the processor, or may be a memory chip that is addressed by the processor to perform control functions. Such firmware, software or microcode is executable by the processor and when executed, causes the microcontroller unit to perform its control functions. Such firmware or software could also be stored in or on a tangible medium such as an optical disk or traditional removable or fixed magnetic medium such as a disk drive used to load the firmware or software into a switching system for maintenance, update, manufacturing, or other purposes. It should also be noted that logic circuits can be hard wired to perform these same functions. These could either take the form of a digital or analog/digital design from discrete components, or of an application specific integrated circuit (ASIC) to run the power supply for an LED lighting system.

Figure 5:
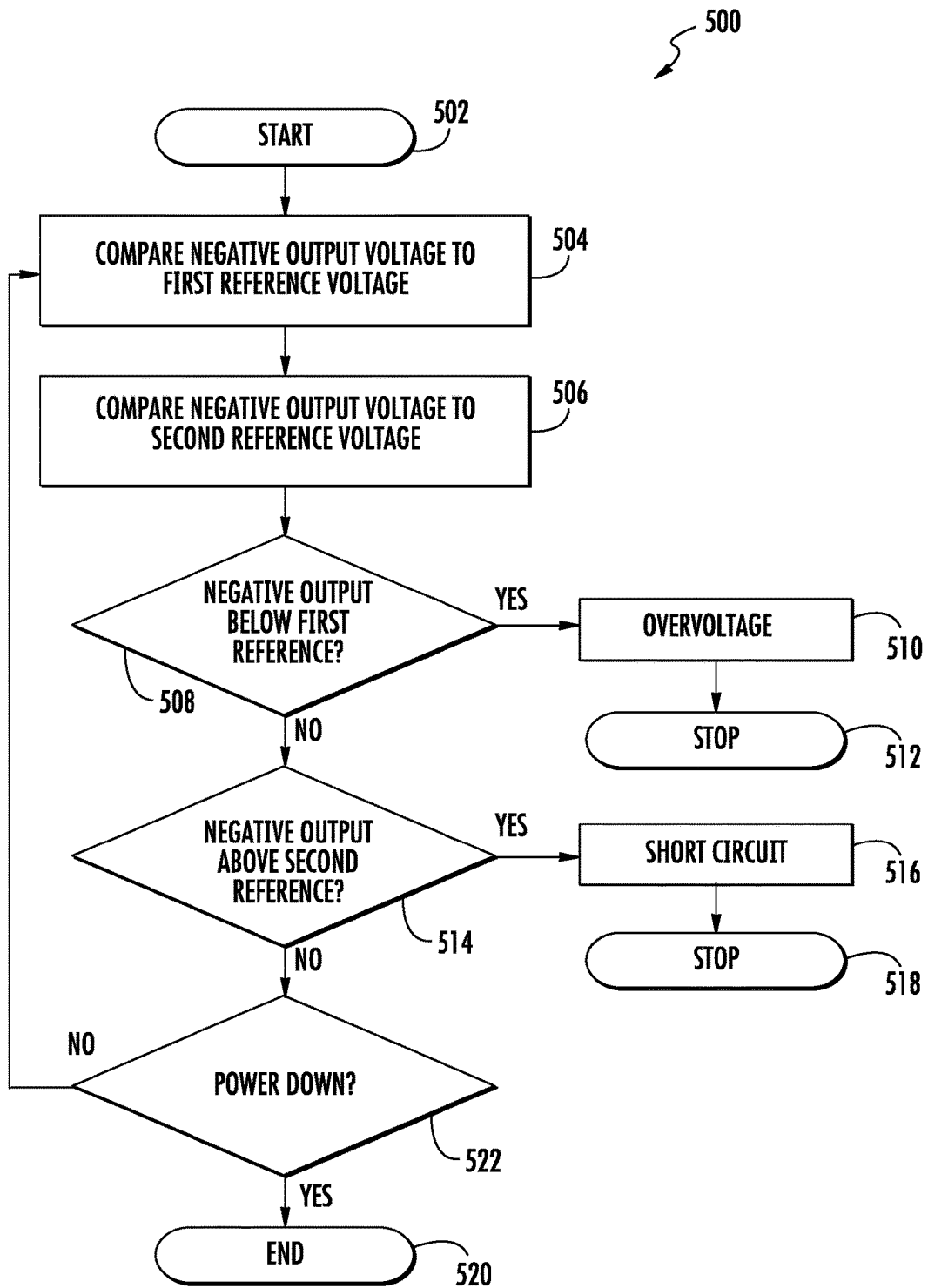
FIG. 5 is a flowchart illustrating the method of operation of the power supplies illustrated in FIG. 3 and FIG. 4.

FIG. 5 is a flowchart illustrating the method of operation of a power supply according to example embodiments of the invention. Like most flowcharts, FIG. 5 illustrates the process as a series of representative process blocks. This process can be executed by a microcontroller and appropriate firmware or software as discussed above. The steady state process is illustrated. Process 500 begins at block 502. At block 504 the microcontroller compares the negative output voltage of the converter to a first reference voltage, which in some example embodiments is the voltage divider reference. At block 506, the microcontroller compares the negative output voltage of the floating buck converter to a second reference voltage, which in some embodiments can be a comparator-based reference voltage. If the negative output voltage falls below the voltage first reference voltage at block 508, the overvoltage condition is detected at block 510 and the power supply is shut down at block 512. If the negative output voltage rises above the second reference voltage at block 514, the overvoltage condition is detected at block 516 and the power supply is shut down at block 518. The process ends at block 520 if the system is shut off by a user at block 522.

Figure 6:
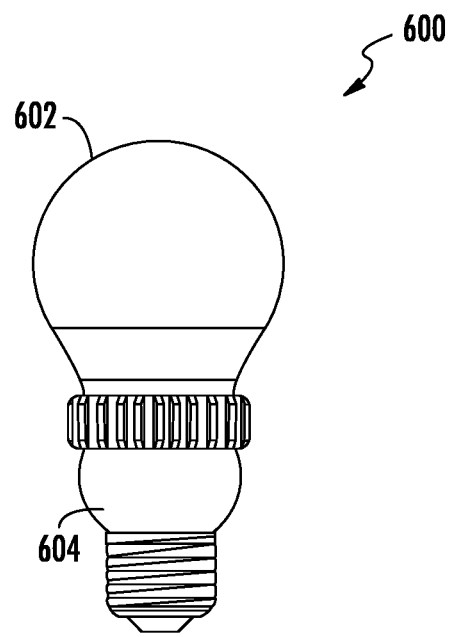
FIG. 6 is an external view of an omnidirectional LED lighting system according to example embodiments of the invention.
Figure 7:
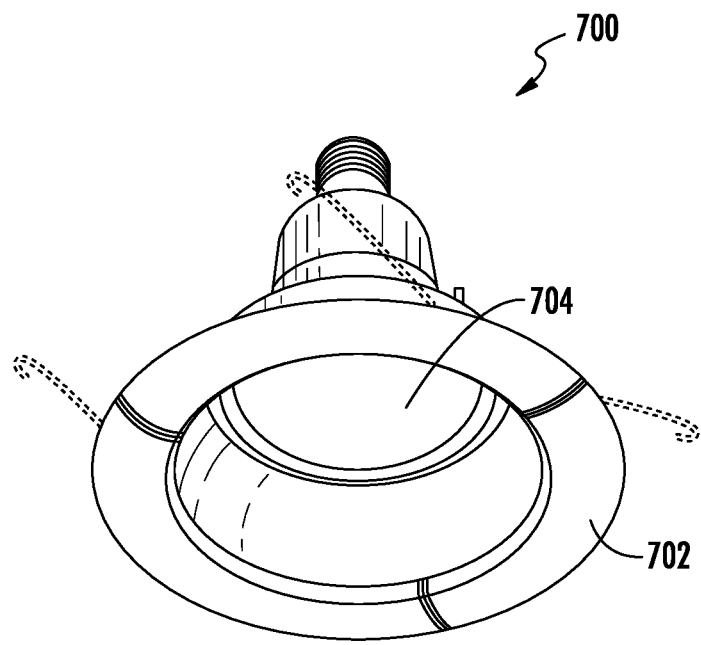
FIG. 7 is an external view of an "downlight" style LED lighting system according to example embodiments of the invention.
Figure 8:
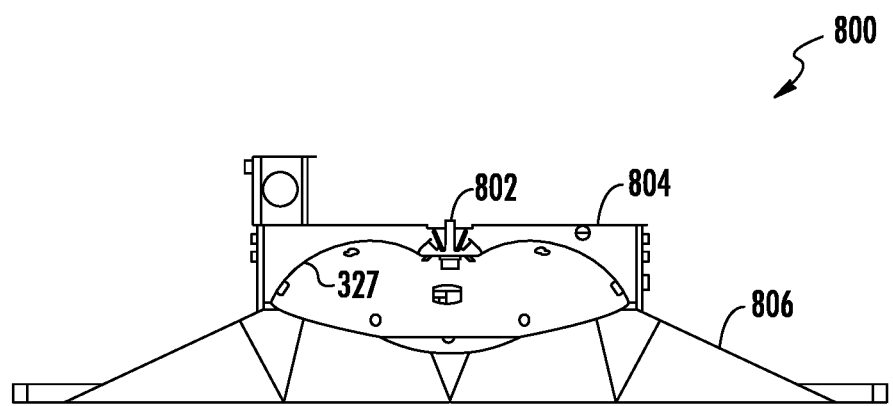
FIG. 8 is a cross-sectional view of troffer-style LED lighting system according to example embodiments of the invention.

Embodiments described herein have particular utility with respect to various form factor light fixtures. For example, each of the embodiments disclosed herein may be alternatively implemented in various types of solid state light fixtures including, for example, downlights, troffers, streetlights, canopy lights, parking garage lights, lights that use waveguide technology and other lighting fixtures. FIG. 6 illustrates an omnidirectional light bulb 600, such as an A19 bulb. Light bulb 600 includes an optical enclosure 602 and a base 604. Other similar consumer lights, such as PAR, BR and candelabra bulbs, can also implement the embodiments described herein. Example lights are described in U.S. Pat. Nos. 8,591,062 and 8,596,819 and U.S. patent application Ser. No. 14/306,342, each of which are incorporated herein by reference. FIG. 7 shows a downlight that can incorporate the embodiments described herein. Downlight 700 includes trim ring 702 and a lens 704 covering the LEDs (not shown). An example of such a down light is disclosed in U.S. Pat. No. 8,777,449 incorporated herein by reference. FIG. 8 illustrates a troffer light fixture that can incorporate the embodiments described herein. Fixture 800 includes an LED assembly 802, a housing 804, and a reflector 806. An example troffer light fixture is disclosed in U.S. Published Patent Publication No. US2012/0327650, herein incorporated by reference.

Figure 9:
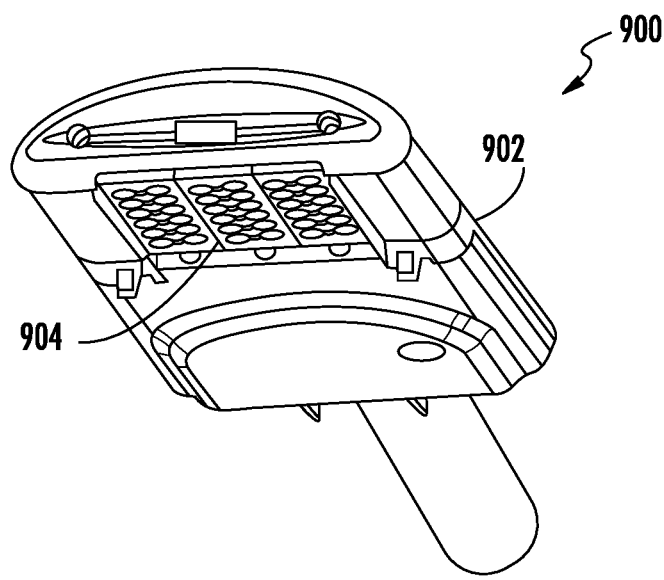
FIG. 9 is an external view of a street light LED lighting system according to example embodiments of the invention.
Figure 10:
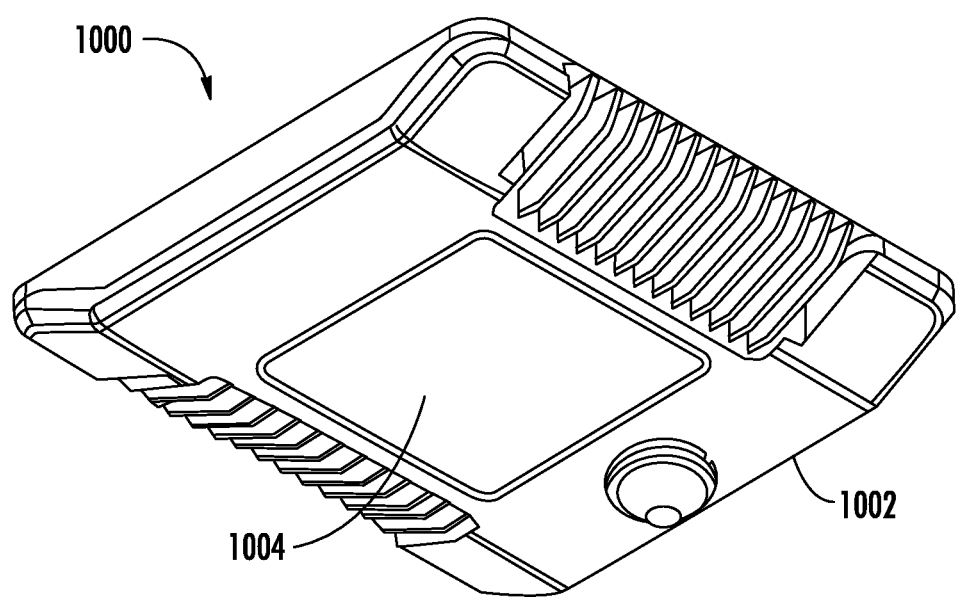
FIG. 10 is an external view of a canopy type LED lighting system according to example embodiments of the invention.

In another example, FIG. 9 illustrates a solid state streetlight 900 according to further embodiments of the present invention. The example streetlight includes a housing 902 and an LED assembly 904. The streetlight may be implemented according to any of the above-described embodiments of the present invention. Other streetlights and outdoor lighting fixtures that can be implemented using the above-described embodiments of the present invention include the lights disclosed in U.S. Pat. No. 8,622,584; U.S. Pat. No. 8,425,071; U.S. Pat. No. 9,028,087; and U.S. Patent Publication No. 2015/0253488, each of which are incorporated herein by reference. Finally, FIG. 10 illustrates a canopy light 1000 according to some embodiments of the present invention. Canopy light 1000 includes housing 1002 and lens 1004. An example canopy light incorporating the embodiments described herein is described in U.S. Pat. No. 9,182,096, herein incorporated by reference. Embodiments of the present invention may also be implemented in various other lighting fixtures, such as, for example, in the waveguide-based troffers disclosed in U.S. Patent Publication No. 2014/0347885, in the troffer style fixtures disclosed in U.S. Patent Publication No. 2012/0051041 and/or in the waveguide based garage lights disclosed in U.S. Patent Publication No. 2014/0355302, each of which are incorporated herein by reference. Other and similar light fixtures can be implemented using the above-described circuitry.

The various portions of a solid-state lamp or lighting system according to example embodiments of the invention can be made of any of various materials. Heatsinks can be made of metal or plastic, as can the various portions of the housings for the components of a lamp. A system according to embodiments of the invention can be assembled using varied fastening methods and mechanisms for interconnecting the various parts. For example, in some embodiments locking tabs and holes can be used. In some embodiments, combinations of fasteners such as tabs, latches or other suitable fastening arrangements and combinations of fasteners can be used which would not require adhesives or screws. In other embodiments, adhesives, screws, bolts, or other fasteners may be used to fasten together the various components.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A power supply comprising:
    a floating converter;
    a reference voltage source connected to a negative output terminal of the floating converter; and
    a microcontroller connected to the reference voltage source and to a control input of the floating converter, wherein the microcontroller shuts down the power supply when a negative output voltage of the floating converter is less than an over-voltage protection level and the microcontroller shuts down the power supply when the negative output voltage is greater than a short-circuit protection level, wherein a reference voltage is generated in the microcontroller and the microcontroller comprises a voltage determining block that automatically adjusts the reference voltage when an output voltage of the floating converter is at a steady state and the microcontroller generates a pulse to shut down the floating converter in response to the negative output voltage dropping below the reference voltage, the reference voltage corresponding to the over-voltage protection level.

2. The power supply of claim 1 wherein the reference voltage source further comprises a voltage divider connected to the microcontroller.

3. The power supply of claim 1 wherein the reference voltage source further comprises a comparator.

4. The power supply of claim 3 wherein the reference voltage source further comprises a voltage divider.

5. The power supply of claim 4 wherein the floating converter comprises a floating buck converter.

6. The power supply of claim 1 wherein the reference voltage source further comprises:
    a comparator; and
    an RC circuit connected between the comparator and the microcontroller.

7. The power supply of claim 6 wherein the floating converter comprises a floating buck converter.

8. An LED lighting system comprising:
    at least one LED;
    a floating converter connected to the at least one LED;
    a reference voltage source connected to a negative output terminal of the floating converter; and
    a microcontroller connected to the reference voltage source and to a control input of the floating converter, wherein the microcontroller shuts down the floating converter when a negative output voltage of the floating converter is less than an over-voltage protection level and the microcontroller shuts down the floating converter when the negative output voltage is greater than a short-circuit protection level, wherein a reference voltage is generated in the microcontroller and the microcontroller comprises a voltage determining block that automatically adjusts the reference voltage when an output voltage of the floating converter is at a steady state and the microcontroller generates a pulse to shut down the floating converter in response to the negative output voltage dropping below the reference voltage, the reference voltage corresponding to the over-voltage protection level.

9. The LED lighting system of claim 8 wherein the floating converter comprises a floating buck converter.

10. The LED lighting system of claim 9 wherein the reference voltage source further comprises a voltage divider connected to the microcontroller.

11. The LED lighting system of claim 9 wherein the reference voltage source further comprises a comparator.

12. The LED lighting system of claim 11 wherein the reference voltage source further comprises a voltage divider.

13. The LED lighting system of claim 8 wherein the reference voltage source further comprises:
   a comparator; and
   an RC circuit connected between the comparator and the microcontroller.

14. The LED lighting system of claim 13 wherein the floating converter comprises a floating buck converter.

15. A method of operating a power supply, the method comprising:
   comparing, by a microcontroller, of a negative output voltage of a floating converter to a first reference voltage;
   comparing, by the microcontroller, of the negative output voltage of the floating converter to a second reference voltage;
   shutting down the power supply by the microcontroller when the negative output voltage of the floating converter is less than the first reference voltage, wherein a reference voltage is generated in the microcontroller and the microcontroller comprises a voltage determining block that automatically adjusts the reference voltage when an output voltage of the floating converter is at a steady state and the microcontroller generates a pulse to shut down the floating converter in response to the negative output voltage dropping below the reference voltage, the reference voltage corresponding to the first reference voltage; and
   shutting down the power supply by the microcontroller when the negative output voltage of the floating converter is greater than the second reference voltage.

16. The method of operating the power supply of claim 15 wherein the floating converter comprises a floating buck converter.

17. The method of operating the power supply of claim 15 wherein the first reference voltage and/or the second reference voltage is generated by a voltage divider.

18. The method of operating the power supply of claim 17 wherein the floating converter comprises a floating buck converter.

19. The method of operating the power supply of claim 15 wherein the first reference voltage and/or the second reference voltage is generated by a comparator.

20. The method of operating the power supply of claim 19 wherein the floating converter comprises a floating buck converter.

\* \* \* \* \*